United States Patent [19]
Galand et al.

[11] Patent Number: 6,038,212
[45] Date of Patent: Mar. 14, 2000

[54] METHOD AND SYSTEM FOR OPTIMIZING THE CONNECTION SET UP TIME IN HIGH SPEED COMMUNICATION NETWORKS FOR RECOVERING FROM NETWORK FAILURE

[75] Inventors: Claude Galand, La Colle; Jean Bidard, Nice; Jean-Paul Chobert, Saint-Jeannet; Gerard Brun, Nice; Olivier Maurel, Le Cannet; Yves Ouvry, Saint Laurent du Var, all of France

[73] Assignee: International Business Machines Corporation, Armonk, N.Y.

[21] Appl. No.: 08/946,243

[22] Filed: Oct. 7, 1997

[30] Foreign Application Priority Data

Dec. 13, 1996 [EP] European Pat. Off. .............. 96480116

[51] Int. Cl.$^7$ ...................................................... H04J 31/08
[52] U.S. Cl. .................... 370/216; 370/256; 340/825.01; 340/827
[58] Field of Search ..................................... 370/216, 217, 370/218, 221, 225, 228, 237, 242, 244, 245, 254, 255, 256, 351, 389, 396, 400; 340/825.01, 827; 379/221; 709/239

[56] References Cited

U.S. PATENT DOCUMENTS 5,491,690  2/1996  Alfonsi et al. .
5,590,118  12/1996  Nederlof ................................. 370/218
5,606,669  2/1997  Bertin et al. ........................ 395/200.15
5,687,167  11/1997  Bertin et al. ............................. 370/254
5,732,072  3/1998  Thamer et al. .......................... 370/225
5,838,660  11/1998  Croslin .................................... 370/216

*Primary Examiner*—Hassan Kizou
*Assistant Examiner*—Ahmed Elallam
*Attorney, Agent, or Firm*—Joscelyn G. Cockburn

[57] ABSTRACT

This method enables optimizing the time required for reestablishing connections between end users attached to a data communication network, which connections were disrupted due to a network failure. The network includes access nodes and transit nodes interconnected with network links/trunks (with no specific distinction being herein required between both designations of a communication line). The end users are attached to the network through access nodes and each said access node permanently stores an image of the current network trunk including the number $N_i$ of connections currently supported by said network trunk. Upon detection of a trunk failure, each access node supporting connections affected by said failure, is made aware of the total number $(N_i)$ of connections in each priority group affected by the failure, together with a network dependent parameter (TP) representing the elementary processing time required to reroute a single network connection. Then each access node may independently, start a first reconnection set-up procedure at a time Ri randomly selected between zero and $(N_i - n_i)^*TP$, where $n_i$ is the number of connections supported by the access node in each priority group, and then space the required subsequent reconnections set-ups by a time equal to $(T_i - R_i)/n_i$, with $T_i = N_i^*TP$.

9 Claims, 10 Drawing Sheets

METHOD AND SYSTEM FOR OPTIMIZING THE CONNECTION SET UP TIME IN HIGH SPEED COMMUNICATION NETWORKS FOR RECOVERING FROM NETWORK FAILURE

TECHNICAL FIELD

The present invention relates to high speed packet switching networks and more particularly to a method and system for minimizing the time required to reroute a set of connections upon a line/node failure in large communication networks.

BACKGROUND ART

Modern digital networks are made to operate in a multimedia environment and interconnect, upon request, a tremendous number of users and applications through fairly large and complex digital communication networks.

Due to the variety of users' profiles and distributed applications, the corresponding traffic is becoming more and more bandwidth consuming, non-deterministic and requiring more connectivity. This has been the driver for the emergence of fast packet switching network architectures in which data, voice, and video information are digitally encoded, chopped into small packets and transmitted through a common set of nodes and links interconnected to constitute the network communication facilities.

An efficient transport of mixed traffic streams on very high speed lines (herein also designated as links or trunks) means for these new network architectures a set of requirements in terms of performance and resource consumption including a very high throughput and a very short packet processing time, a very large flexibility to support a wide range of connectivity options, an efficient flow and congestion control.

One of the key requirements of high speed packet switching networks is to reduce the end to end delay in order to satisfy real time delivery constraints and to achieve the necessary high nodal throughput for the transport of voice and video. Increases in link speeds have not been matched by proportionate increases in the processing speeds of communication nodes. The fundamental challenge for high speed networks is to minimize the processing time and to take full advantage of the high speed/low error rate technologies. Most of the transport and control functions provided by the new high bandwidth network architectures are performed on an end to end basis. The flow control and particularly the path selection and bandwidth management processes are managed by access points of the network which reduces both the awareness and the function of the intermediate nodes.

In high speed networks, the nodes must provide a total connectivity. This includes attachment of the user's devices regardless of vendor or protocol, and the ability to have the end user communicate with any other device. The network must support any type of traffic mix including data, voice, video, fax, graphic or image. The nodes must be able to take advantage of all common carrier facilities and to be adaptable to a plurality of protocols. All needed conversions must be automatic and transparent to the end user.

Communication networks have at their disposal limited resources to ensure efficient transmission. An efficient bandwidth management is essential to take full advantage of a high speed network. While transmission costs per byte continue to drop year after year, said transmission costs are still likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth.

An ideal network should be able to transmit useful traffic directly proportional to the traffic offered to the network and this until the maximum transmission capacity is reached. Beyond this limit, the network should operate at its maximum capacity whatever the demand is.

A general problem in the communication networks is to find a path between a source and a destination node. For virtual circuits operation, the path decision is done once only at the time of the connection (or session) establishment, or, and this is particularly important for this invention, upon any network failure like in case of link or node failure for rerouting the disrupted connections. The choice of a routing algorithm is not easy because it must satisfy a large number of often conflicting requirements. The routing or rerouting algorithm must allow the network to operate in an optimal way, according to a criterion which can vary with the utilization type. In most of the cases, the network is realized so as to minimize the packet transit time and to transfer the maximum number of packets. In other cases, the objective is to decrease the communication cost, or to develop a reliable network able to operate correctly either in case of catastrophic line or node failure or in case of peaks of traffic.

Because of the variety of the constraints, there is a large number of different routing types like flooding routing, random or stochastic routing, deterministic routing. This last routing technique can be implemented according to particular modes such as fixed or adaptive routing, centralized or distributed routing, node by node or end to end routing, connection oriented or connectionless routing.

Contrary to the Fixed Routing, where the routing rules are established once for all, the purpose of the Adaptive Routing is to satisfy at any time the optimization criteria. Routing Tables are permanently updated according to the instantaneous state of the traffic on the links.

When the characteristics of the network fluctuate, it is possible to adapt the routing by assigning to one node the responsibility to update periodically the routing tables according to the traffic and the topology. The principal disadvantage of this method called Centralized Routing is to generate an important auxiliary traffic and to subordinate the good functioning of the network to only one node. On the other hand, the Centralized Routing can generate some problems at the time the tables are refreshed because corresponding updatings cannot be performed at the same time by all the nodes.

The solution is to decentralize the tables at the level of each node. The corresponding Distributed Routing is a method in which neighboring nodes are exchanging messages concerning the traffic and the network conditions to update their own routing tables.

In order to minimize the processing time and to take full advantage of the high speed/low error rate technologies, the transport and control functions provided by the high bandwidth networks may be performed on an end to end basis. No hop by hop error recovery or retransmission is envisioned in high speed, high performance (low error) links and thus, there is no need for transit nodes to be aware of all individual transport connections. The originating node (access node) is responsible for calculating the route that a packet must take through the network. The routing of the packets presents two aspects for which a wide range of implementing methods exist. Said routing includes determining what the route for a given connection shall be, and actually switching the packet within a switching node.

We shall consider herein that the high speed connections between end users are established on a reserved path to guarantee the bandwidth and the quality of service requested by the user. The path across the network is computed in response to each connection request by the originating node. The computed path is based on the parameters characterizing the network connection requirements and on link capacity and load information maintained within each network node. The originating node sends a reservation request to the end node. As the bandwidth request packet flows along the network, each transit node determines whether it has enough capacity to accept the new connection. If the connection is accepted, the requested bandwidth is reserved. Changes are reflected in every node of the network by means of control messages broadcasted through so-called spanning tree arrangement of the network. Once a connection is established, there is no need to place a destination address in the packet header every time a packet is sent. All that is needed is an identifier to be used to specify which connection is to be used for this packet. Due to the low packet overhead, the connection oriented routing technique is particularly adapted to the transmission of very short packets (for example for real-time voice connections). This technique requires that connection tables be set up and maintained dynamically in each node. The implementation of flow and congestion control in a connection oriented network is easier than in a connectionless one, because network nodes can regulate the flow on individual connections. However, when a link or a node becomes inoperative (i.e. goes down), connections that were passing through the affected link or node are typically lost. A new connection must be established through a different route. This rerouting takes time and may disrupt the connection at the end user level.

A Path Selection process is used to determine optimum paths for users across the network each time a connection is requested either at call set-up or upon link or node failure. This implies the allocation of network resources to users in order to guarantee their quality-of-service requirements while optimizing the overall throughput within the network. This function takes place entirely within the origin node. Various quality of service parameters may be specified by the users, some of them in order to satisfy realtime delivery constraints, others related to non real time data traffic transfer. Accordingly, so-called priority classes are defined that specify the corresponding quality of service guaranteed.

In order to establish a connection, the origin node computes a path to the destination node that is capable of carrying the new connection and providing the quality level of service required by the new connection. The Path Selection algorithm uses data describing the current traffic load in the entire network (nodes and links). Such data are stored in a topology database located in each node of the network. If no suitable path can be found to meet all requirements, the connection is rejected. Once, the origin node has found a suitable path, a connection set-up message is generated which traverses the selected route, reserving the required resources and updating the resource allocations for each link visited by the set up message.

To meet high throughput requirements, paths are selected and resources reserved once only at the time of the connection establishment and upon specific events, including link failure. The Path Selection algorithm takes into account various constraints which come both from the user (quality of service requirements, user's traffic characteristics . . . ) and from the current network topology and bandwidth allocation. In addition, the algorithm maximizes the network throughput by choosing a path with the least number of hops and which tends to achieve an even distribution of the traffic among the links. Once an appropriate path has been selected, the network connection establishment process takes place, and only then are the resources along the path reserved.

Therefore selecting a path and setting up a connection can take considerable processing overhead in network nodes and can generate a significant delay. For end nodes supporting multiple connection set-up requests simultaneously, the time for establishing a connection may be huge. The origin node must compute the path to the destination node that is capable of carrying the new connection and provide the level of service required by the new connection. The path selection algorithm uses data describing the current traffic load in the entire network (nodes and links). Such data are stored in the topology database located in each node of the network.

For connections service in real-time, the delays are a very important parameter, especially since some connections terminate in equipment that runs time-outs.

Those delays are also important from the point of view of path switching requirement upon link/node failure within the network. The rerouting of a lot of connections that were using a failing link or node may lead to a high number of simultaneous new path set-ups. The establishment in parallel of multiple new connections through alternate routes takes time and usually disrupt the connections at the end user level.

In view of the above, it appears that while optimizing the network traffic capacity is a must from a cost efficiency viewpoint, any link or node failure may generate an important control traffic load by itself, that may paralyze the network. Some facilities such as the so-called spanning tree organization have been provided to optimize control traffic operation under such critical situations.

For more information on the Spanning tree operation, one may refer to the European Application 94480046.1, published Nov. 29, 1995 with the Number 0684716 and title "A Data Communication Network and Method for Operating said Network".

While control traffic flow has been improved with the above described arrangements, it may still suffer a major drawback from the fact that the number of simultaneous rerouting requests in case of link or node failure are undefined and may be very large. In the worst case, all these requests may use the same link and therefore require processing in the same node. The node may be unable to process such large amounts of requests and beyond a certain number of reroutings per second the node queue, devoted to the buffering of rerouting requests becomes overloaded, resulting into loosing requests messages, starting retry procedures and possibly leading to unacceptable delays on rerouting if not completely jamming the network.

In addition, when several links fail simultaneously (typically on node failure case) local topology database(s) may be unupdated. Some data used for rerouting connections are thus invalid. The rerouting mechanism shall then reconsider rerouting through links actually invalid, which contributes to further jamming the network with unnecessary control traffic.

OBJECTS OF THE INVENTION

One object of this invention is to provide a method and system for optimally managing rerouting of established network connections.

Another object of this invention is to provide a method and system for optimally managing rerouting of established network connections in case of network link/trunk failure.

Another object of this invention is to provide a method and system for optimally managing rerouting of established network connections in case of multiple link/trunk failures, or node failure.

Still another object of this invention is to provide a method and system for managing rerouting of established network connections in case of link/trunk or node failure, while taking into account the actual traffic priorities.

A further object of this invention is to provide a method and system for managing rerouting of established connections in case of network node or link/trunk failure minimizing colliding reroutings.

Still another object of this invention is to provide a method and means for managing rerouting of established connections in case of network link/trunk or node failure, while minimizing installation cost on presently available digital networks.

A still further object of this invention is to provide a self adaptive method and means for optimally managing rerouting of established connections in case of link/trunk or node failure.

SUMMARY OF THE INVENTION

The above mentioned objects are achieved by a method and means for optimizing the connection set-up time and correlative communication bandwidth occupation required to perform connection reroutings to recover from network failure, in a high speed communication network interconnecting end-users via so-called connection paths, through network nodes and links/trunks, said nodes including access nodes and intermediate nodes, said users being attached to the network via access nodes, each node storing an image of current operating network information into a so-called Topology Database including the current number of connections ($n_i$) originating in said access node (i) for each network trunk, and including means for updating said image, said method including:

- detecting a network failure and identifying a trunk involved in said network failure, whereby a so-called trunk failure is being identified;
- noting the total number (N) of connections affected by said trunk failure;
- broadcasting said N number throughout the network whereby each network access node (i) affected by said trunk failure is being provided with said (N) information;
- providing each said access node with a network dependent parameter (TP), representing the elementary processing time required for rerouting a single network connection;
- providing each said affected access node with a random number ($R_i$) between zero and $(N-n_i)*TP$;
- computing a delay $TNP_i=(T_i-R_i)/n_i$, wherein $T_i=N*TP$; and,
- in each said access nodes affected by said link failure, starting reconnection set-up operations at time $R_i$ and spacing the subsequent connections set-ups by a time equal to $TNP_1$.

Therefore, the present invention provides a method and system for optimizing the delay for rerouting network connections in case of link/trunk (with no specific distinction being herein required between both these line designations) or node failure, as well as in case of connection preemption operations, for any reason, which preemption shall be herein considered as link failure.

These and other objects, characteristics and advantages of the invention will become more apparent from the following detailed description of a preferred embodiment of the invention when considered with reference to the accompanying drawings.

DESCRIPTION OF A PREFERRED EMBODIMENT OF THE INVENTION

Figure 1:
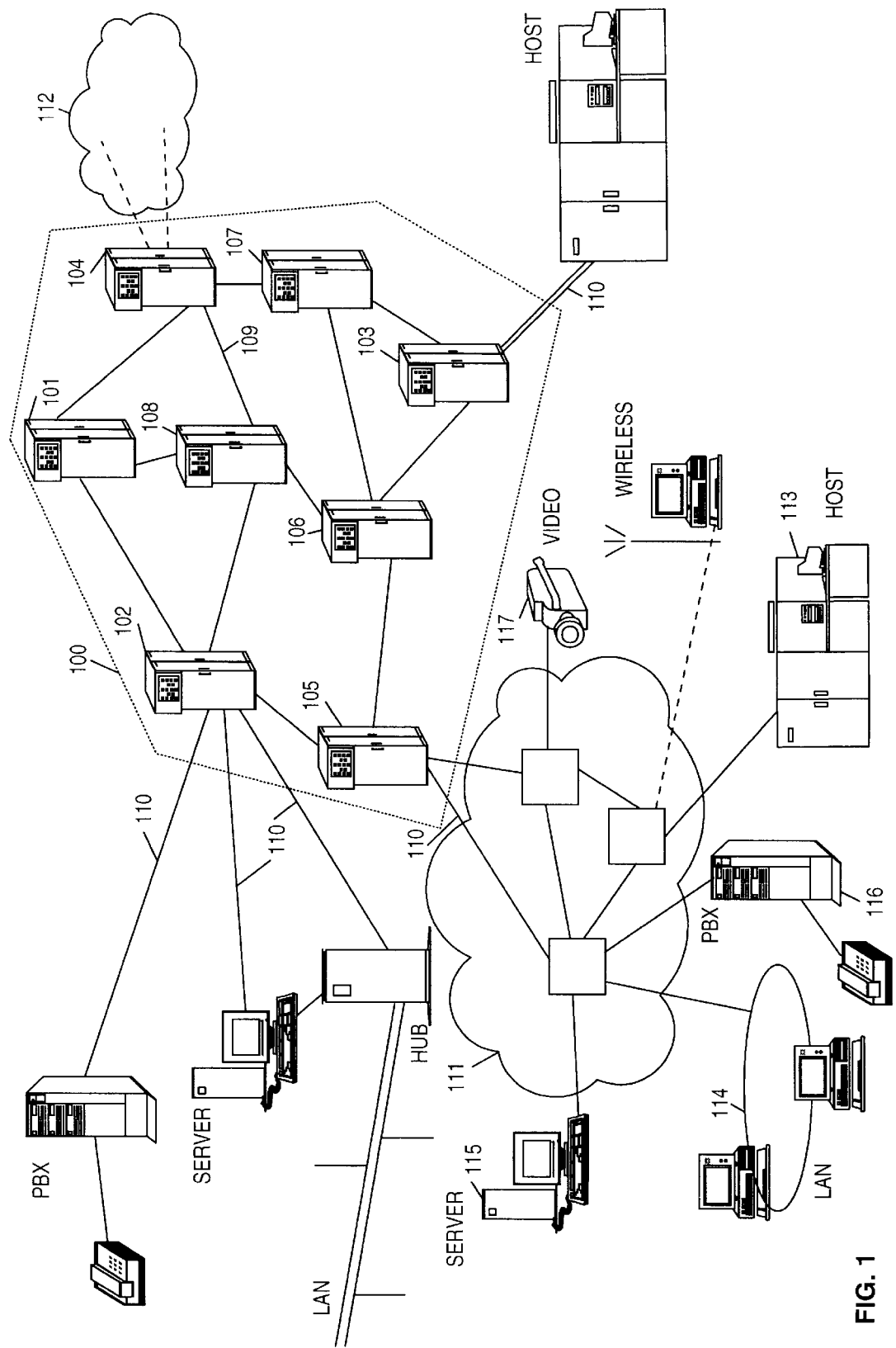
FIG. 1 is a schematic representation of a modern communication network wherein the invention may be implemented.

As illustrated in FIG. 1 a typical model of communication system is made of several user networks (111, 112) communicating through a high performance network (100) using private lines, carrier provided services, or public data networks. Each user network (see 111) can be described as a set of communication processors and links interconnecting large computers attached on a LAN (Local Area Networks 114), applications servers (115), PBX (Private Branch eXchange) (116) or video servers (117). These user networks, dispersed in different establishments need to be interconnected through wide area transport facilities, such as network 100 operating in Asynchronous Transfer Mode (ATM) over data packets.

The system is essentially looking for a high speed data transfer. To that end, the transmission routing and switching techniques within the nodes (101 through 108) are optimized to process the flowing packets towards their final destination at the highest possible rate. The present invention applies essentially to any of the fast packet switching network architecture including the one detailed in the following paragraphs.

The high speed packet switching transmission system of FIG. 1 comprises eight nodes (101 to 108) said nodes being interconnected by means of high speed communication lines called Trunks or links (109). The access (110) to the high speed network by the users is realized through Access Nodes (102 to 105) located at the periphery. These Access Nodes comprise one or more Ports, each one providing an Access Point for attaching external devices supporting standard interfaces to the network and performing the conversions required to transport the users data flow across the network from and to other external devices. For example, the Access Node 102 interfaces respectively a Private Branch exchange (PBX), an application server and a hub, through three Ports and communicates through the network by means of the adjacent Transit Nodes 101, 105 and 108.

Each network node (101 to 108) includes a Routing Point where the incoming data packets are selectively routed on the outgoing trunks towards the neighboring Transit Nodes. The routing decisions are made according to the information contained in the headers of the data packets. In addition to the basic packet routing function, the network nodes provide ancillary services such as:

determination of routing paths for packets originated in the node, directory services like retrieving and updating information about network users and resources, maintenance of a consistent view of the physical network topology, including link utilization information and, reservation of resources at access points of the network.

Each Port is connected to a plurality of user processing equipments, each user equipment comprising either a source of digital data to be transmitted to another user system, or a data sink for processing digital data received from another user system, or, typically, both. The interpretation of the users' protocols, the translation of the users data into packets formatted appropriately for their transmission on the packet network (100) and the generation of a network layer header to route these packets are executed by an Access Agent running in the Port. This network layer header is made of Control, Routing and Redundancy Check Fields.

The Control Fields include, among other things, an encoded identification of the protocol to be used in interpreting the Routing Fields.

The Routing Fields contain all the information necessary to route the packet through the network (100) to the destination End Node to which it is addressed. These fields can take several formats depending on the routing mode specified.

The Redundancy Check Fields are used to check for errors. If an error is detected, the packet is discarded.

Figure 2:
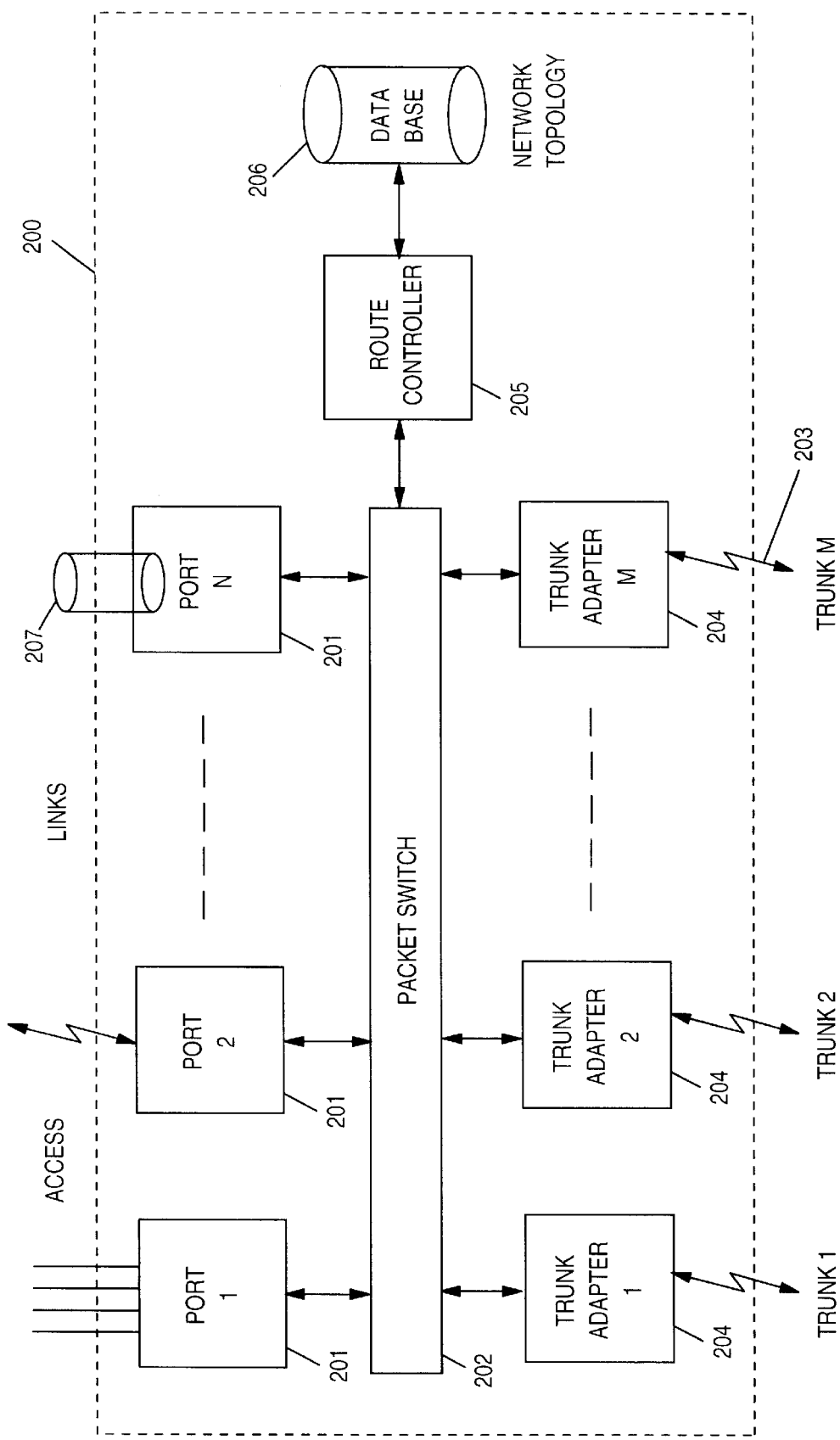
FIG. 2 is a block diagram of a detailed representation of a communication network node.

FIG. 2 shows a general block diagram of a typical Routing Point (200) such as it can be found in the network Nodes (101 to 108) illustrated in FIG. 1. A routing point comprises a high speed packet Switch (202) onto which packets arriving at the Routing Point are entered for being oriented toward the appropriate node exit. Such packets are received from other nodes over high speed transmission links (203) via Trunk Adapters (204), or from users via application adapters called Ports (201). In the present application, no distinction being made between the wordings link and trunk.

Using information in the packet header, the adapters (204, 201) determine which packets are to be routed by means of the Switch (202) towards a local user network (207) or towards a transmission link (203) leaving the Node. The adapters (201 and 204) include queuing circuits for queuing packets prior to or subsequent to their launch on the Switch (202).

A Route Controller (205) performing Trunk Connection Management (TCM) operations calculates the optimum routes through the network (100) so as to minimize the amount of network resources used to complete a communication path, and builds the header of the packets generated in the Routing Point. The optimization criteria includes the characteristics of the connection request, the capabilities and the utilization of the trunks in the path, the number of intermediate nodes, etc.

All the information necessary for the routing, about the nodes and transmission links connected to the nodes, are contained in a Network Topology Database (206). Under steady state conditions, every Routing Point has the same view of the network, but this might not be the case at all instants. The network topology information is updated when new links are activated or new nodes added to the network, or, as such will be the case in the present invention, in case of links or node failure. Such information is exchanged by means of control messages with all other Route Controllers to provide the necessary up-to-date information needed for route calculation (such database updates are carried on control packets very similar to the data packets between end users of the network). The fact that the network topology is kept current in every node through continuous updates allows dynamic network reconfigurations. But control packets add to actual data flow within the network and therefore should be minimized to optimize network operation.

The incoming transmission links to the packet Routing Point may comprise links from external devices in the local user networks (110) or links (Trunks) from adjacent network nodes (109) of network (100). In any case, the Routing Point operates in the same manner, to receive each data packet and forward it onto another Routing Point as dictated by the information in the packet header.

The routing within the network presents two aspects:

1. Determining what shall be the route (i.e. path) for a given connection and setting-up said route.

2. Actually switching the packet within a switching node after the route has been actually set and acknowledged by all involved network nodes.

There are many methods for determining a route through a network for very high throughput. One of these methods used in the field is the path selection method using the so-called Bellman-Ford algorithm which is executed whenever an end user attached to the entry node (i.e. access node) providing a port (e.g. node 102) is to be connected to another end user attached to an exit node (e.g. node 103). The path selection involves scanning all possible links connecting the network nodes to help selecting the best network path between said two end users. Once a path has been selected, the entry node sends a call set up message to each node on said path, down to the exit node. The call set up message is processed in each said individual nodes by the so called Transit Connection Manager (TCM) which manages the bandwidth of each trunk involved in the selected path. Once the route is selected, the critical item is that the switching elements must be able to route an incoming packet in a very short portion of time.

Network Control Functions are implemented to control, allocate, and manage the resources of the physical network. Each Routing Point has a set of the foregoing functions in the Route Controller (205) and uses it to facilitate the establishment and the maintenance of the connections between users applications. The Network Control Functions include in particular:

Directory Services:

for retrieving and maintaining information about network users and resources.

Bandwidth Management:

for processing the bandwidth reservation and maintenance messages, and for monitoring the current reservation levels on links.

Path Selection for choosing the best path for each new connection considering the connection requirements and the current link utilization levels.

Control Spanning Tree for establishing and maintaining a routing tree among the network nodes, for using it to distribute control information (in parallel) including link utilization, and for updating nodes and their Topology Databases with new network configurations or link/node failures information.

The Control Spanning Tree is the principal system used to disseminate control information such as Topology Database (206) updates. This mechanism is fundamental to minimize delays due to intermediate node processing whereby an intermediate node will get each control message exactly once on the tree, and the message can be forwarded along outgoing links of the tree before the intermediate node has even looked at the packet contents.

A distributed algorithm creates and maintains the Control Spanning Tree in case of node or link failures and helps minimizing the impact of the increased control flows that result when the network grows or fails. Said algorithm performs Topology Updating and Congestion Control operations. Topology updating distributes and maintains, in every node, information about the physical and logical network (including link utilization information and link bandwidth reservation information) using the Control Spanning Tree.

For more information on Spanning Tree operation, one may refer to the above cited reference.

Figure 3:
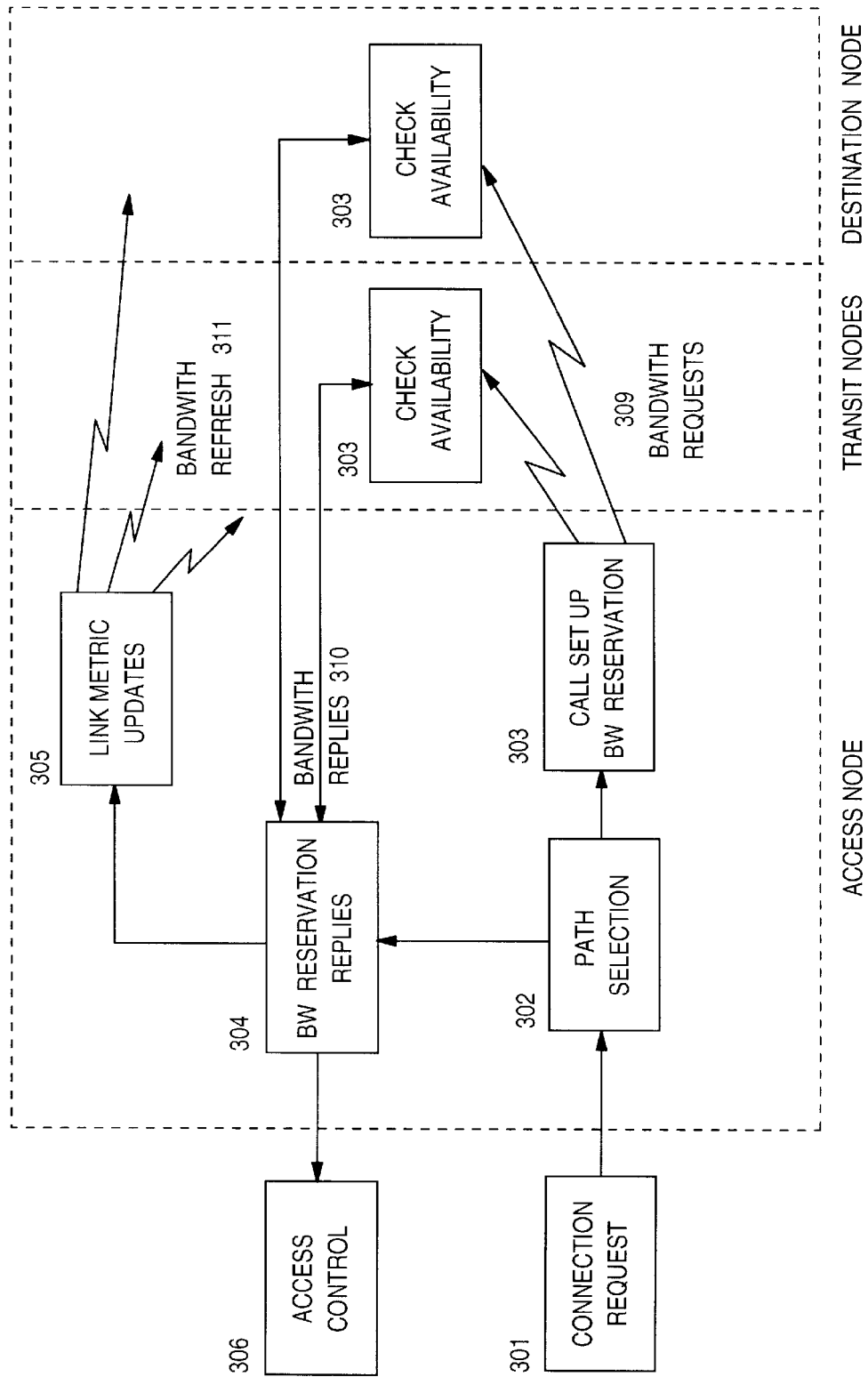
FIG. 3 is a schematic representation of the various operations involved in a call set up to establish connection between end users of the network.

The complexity of establishing a path, i.e. a connection between users at call set up, or for reestablishing connections between end-users upon link or node failure, may be illustrated by FIG. 3 showing the mechanism of a call (connection) set-up operation.

At connection set-up, two paths (connections), one for each direction, are computed, between the origin access node and the destination access node attached to the source user and the destination or target user, respectively. The connection set-up and bandwidth reservation process made accordingly operate as follows:

(301) a Connection Request is specified via a set of parameters including origin and destination network address, and data flow characteristics (bit rate, burstiness).

(302) a Path Selection process determines a path and a set of connection requests, one for each link of the path, using parameters provided by the Topology Database.

(303) a Bandwidth Reservation process uses the connection requests to reserve bandwidth on each of the links on the path. This process involves exchange of information (309) between the origin (access) node, the transit nodes on the path, and the destination node.

(304) Bandwidth Reservation Replies from transit nodes and end node generate either a call acceptance or a call reject (310).

(305) a Link Metric Update process updates, in case of call acceptance, the modified link metrics. This information (311) is sent through the Control Spanning Tree to the Topology Database of each node in the network by means of a broadcast algorithm.

(306) an Access Control Set Up adjusts, if the call is accepted, an access control device according to the network connection characteristics (leaky bucket, etc.).

Given the above facilities, let's assume a trunk failure on trunk (109) between nodes (108) and (104) providing a port to network (112). The trunk failure is detected by node (108) facilities. Due to the information contained in node (108), Topology Database may identify all ports whose traffic shall be disturbed by the link failure. With presently available network facilities, a centralized rerouting process to overcome the link failure would be fairly expensive to implement. A control message is then dispatched via the network Spanning Tree towards said nodes (say nodes 102, 103 and 105). Said control message is collected by each involved Control Agent in charge of managing connection establishments for the users connected to the corresponding port.

Each entry node, i.e. its Connection Agent, knowing its own connections disrupted by the above mentioned link failure between nodes (108) and (104) shall have to reroute its connections. With the presently available facilities, each involved Connection Agent looks, independently, for reroutings. Due to fairly large numbers of involved network ports and corresponding connections, the additional control traffic generated is already important. But in addition, the conflicts between colliding reroutings, and correlative retries, emphasized by QoS (i.e. priority)requirements, do generate an important control traffic. Not to mention the case of simultaneous network failures which aggravates the situation.

Figure 4:
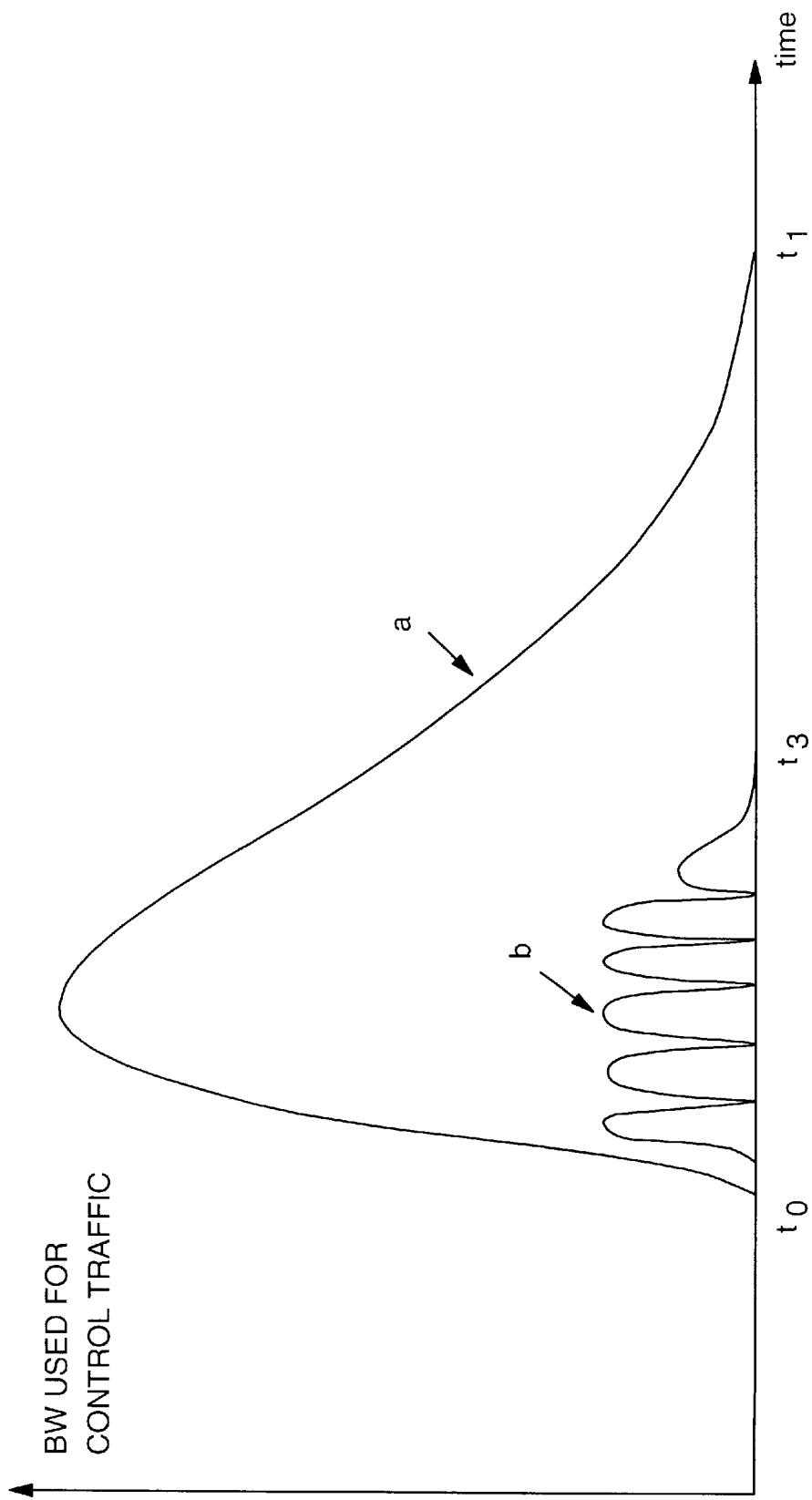
FIG. 4 illustrates communication bandwidth occupations versus time for performing connections rerouting operations upon a network failure, with prior art facilities (a) and facilities based on the invention (b).

Represented in FIG. 4, curve (a) is the network bandwidth versus time used with presently available facilities, for control traffic during said rerouting upon failure procedure. As it can be seen, not only the bandwidth is fairly large, say between rerouting starting time $t_0$ and time $t_1$; but also the time required for stabilizing the network additional bandwidth due to rerouting procedure is rather long. The present invention shall provide a synchronized rerouting process optimizing additional installation cost on available networks, while minimizing required bandwidth and time (see curve b).

Figure 5:
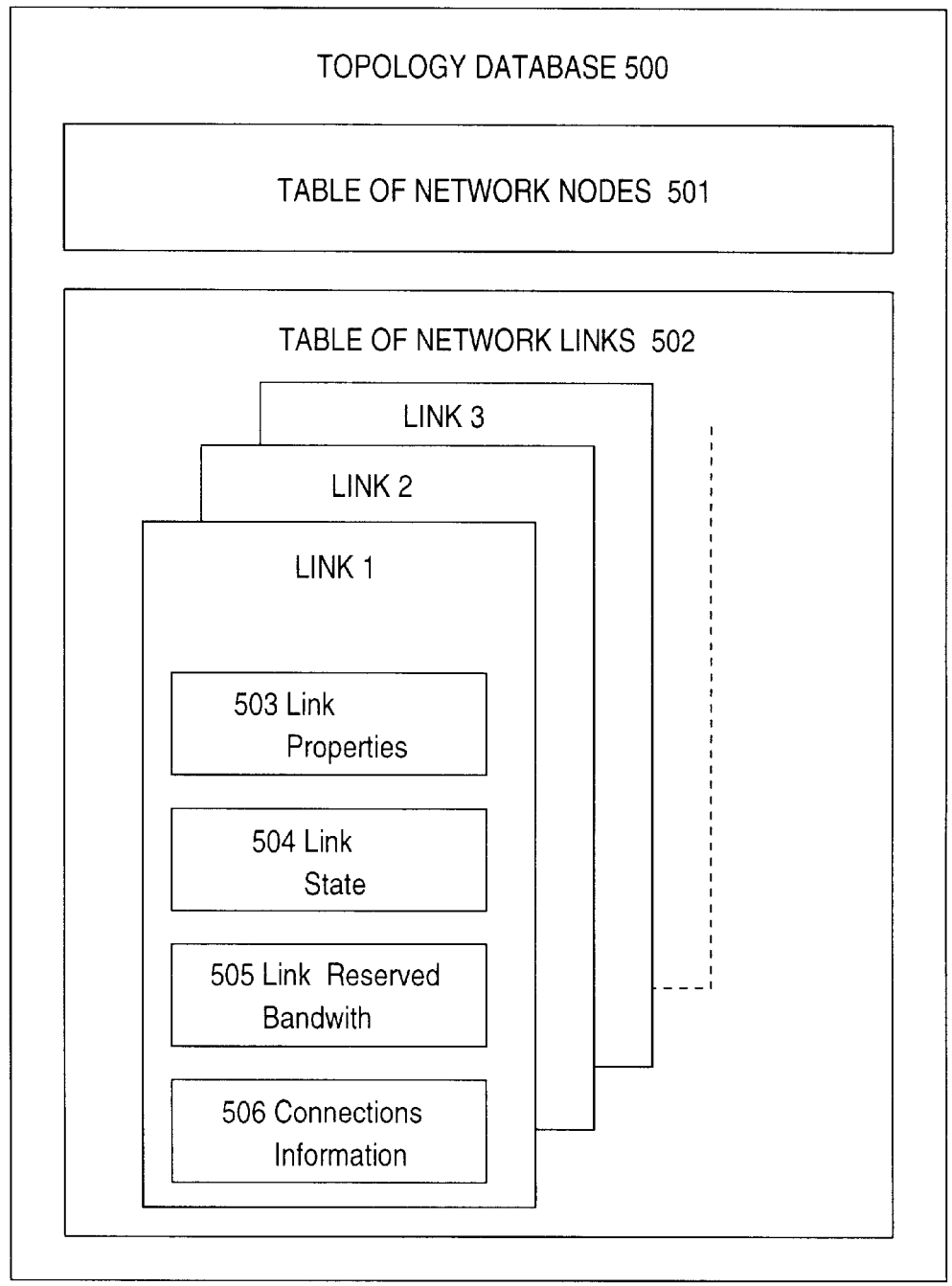
FIG. 5 is a schematic representation of a so called Topology Database.

To that end, the Topology Databases have been amended to look as represented in FIG. 5.

The Topology Database shall contain information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilization which includes dynamic characteristics like current bandwidth (used and reserved), real time measurements.

The general organization of the Topology Database as shown in FIG. 5, shows that to each resource of the network, nodes (501) or links (502), is associated an entry in the database. In particular, each link entry includes the following characteristics:

(503) the link physical properties:
transmission medium and speed,
routing mode supported,
maximum packet size,
link buffer capacity,
propagation delay,
bandwidth reservation supported . . .

(504) the link state:
on-line (link can accept user connections),
quiesce (link cannot accept additional user connections, but existing connections continue),
off-line (link cannot accept user connections and existing connections are cancelled) . . .

(505) the link utilization:
  real time measurements,
  reserved bandwidth, . . .
(506) the connections information:

This section of the Topology DataBase contains, for each link, the data necessary to perform efficiently the rerouting of the user connections using that link. The rerouting of a connection is an attribute of the connection definition. If supported, rerouting is attempted in case the full path assigned to the considered connection is, for any reason, no more available. This may be due to a link or node failing along the path or in case of connection preemption operation by a higher priority connection.

The connections information (506) collects the minimal data to allow the scheduled rerouting. Assuming the predefined connection priorities (Four for the preferred embodiment of this invention) are stored in the Topology DataBase, said information may include:
  number of connections supporting the rerouting in the first priority group,
  number of connections supporting the rerouting in the second priority group,
  number of connections supporting the rerouting in the third priority group,
  number of connections supporting the rerouting in the fourth priority group,
  average processing time of a single rerouting using this link.

The connections information hold dynamic data, mainly the number of connections supporting rerouting on each priority group. As any other dynamic data about the link the information is distributed to every node's topology as a data of control information.

Figure 6:
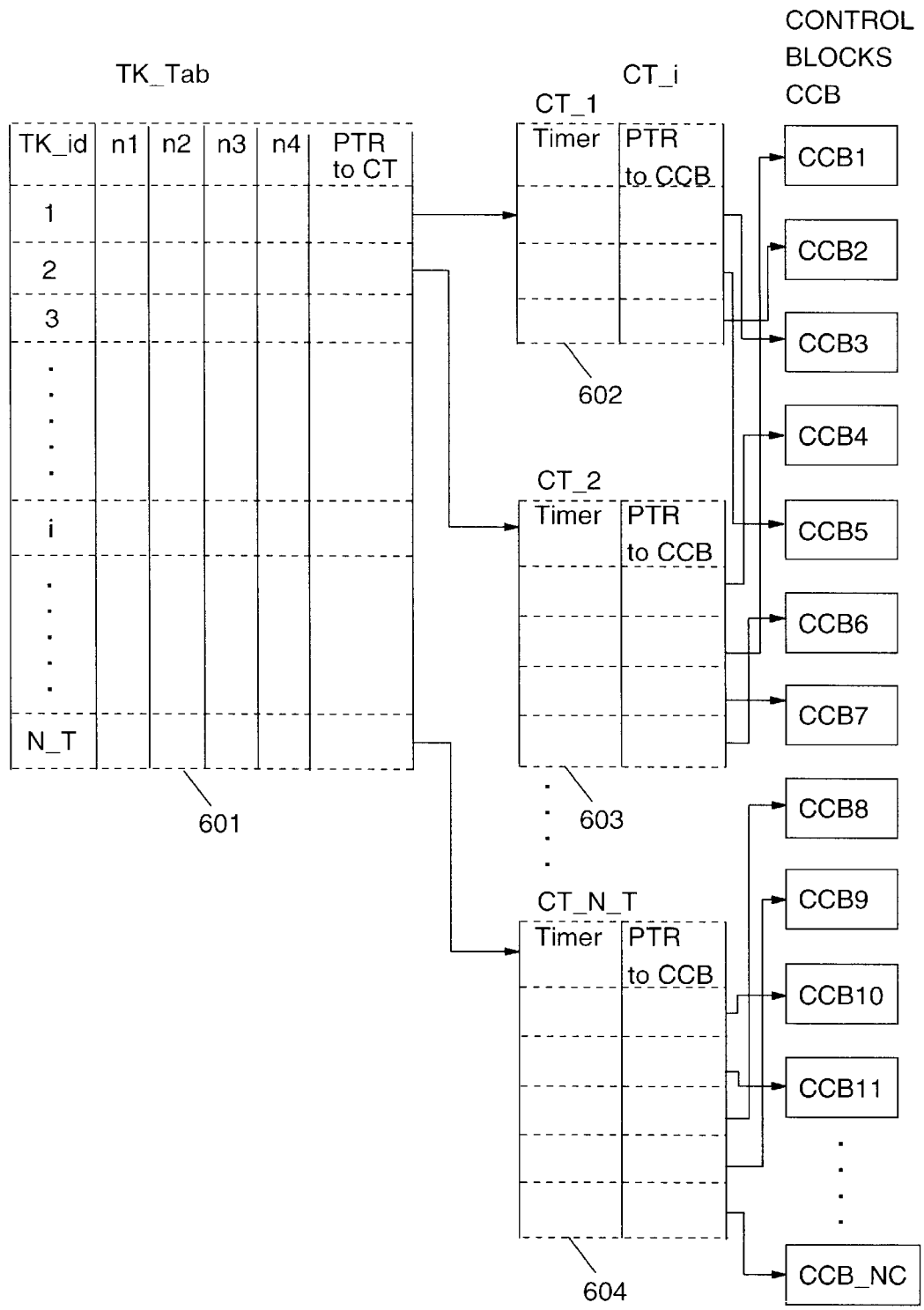
FIG. 6 is a schematic representation of network facilities to be used to implement the invention.

Given the above, each network port image of its own occupation of the network and the parameters used accordingly are summarized in FIG. 6.

First, the Connection Agent of the considered port includes a Trunk Table (TK_Tab) (601). Said table identifies each network trunk through its Trunk id (TK_id$_i$) with i=1,2, . . . N_T, N_T being the total number of network trunks. For each TK_id, the numbers of connections, in each priority group $n_i$ (with i=1,2,3,4 . . . for the preferred embodiment of this invention) have been stored. Also stored for each TK_id is a pointer (PTR) to a Connection Table (CT_i with i=1,2, . . . N_T). The Connection Tables (e.g. 602, 603, 604) are used to store Timers, i.e. values to be stored in a counter which is, in operation, decremented until it reaches zero and then sets an interrupt to trigger the required rerouting routine. Also stored in each Connection Table are pointers (PTR) to Connection Control Blocks (CCB). The Control Blocks are used in each network port to define, for a given connection, a number of parameters such as port origin, destination, QoS, Bandwidth involved, etc. . . . Those information are used in the port Connection Agent to compute a path throughout the network and then set the connection and update the Topology Database accordingly.

Given these information, each involved Connection Agent may then locally schedule its own reroutings in a synchronized manner without requiring central network management. Priorities shall be taken care of, by each Connection Agent waiting for the time required for processing all higher priority connections involved in the rerouting process, prior to starting to process a considered priority of connections. In addition, each Connection Agent shall somehow within each priority group, compute how its own connections in that group should be scheduled in time relative to the overall failing connections of same priority. The last parameter required is the elementary time (TP) required by the considered system equipment (e.g. Trunk Connection Manager (TCM)) for processing one connection rerouting.

Figure 7:
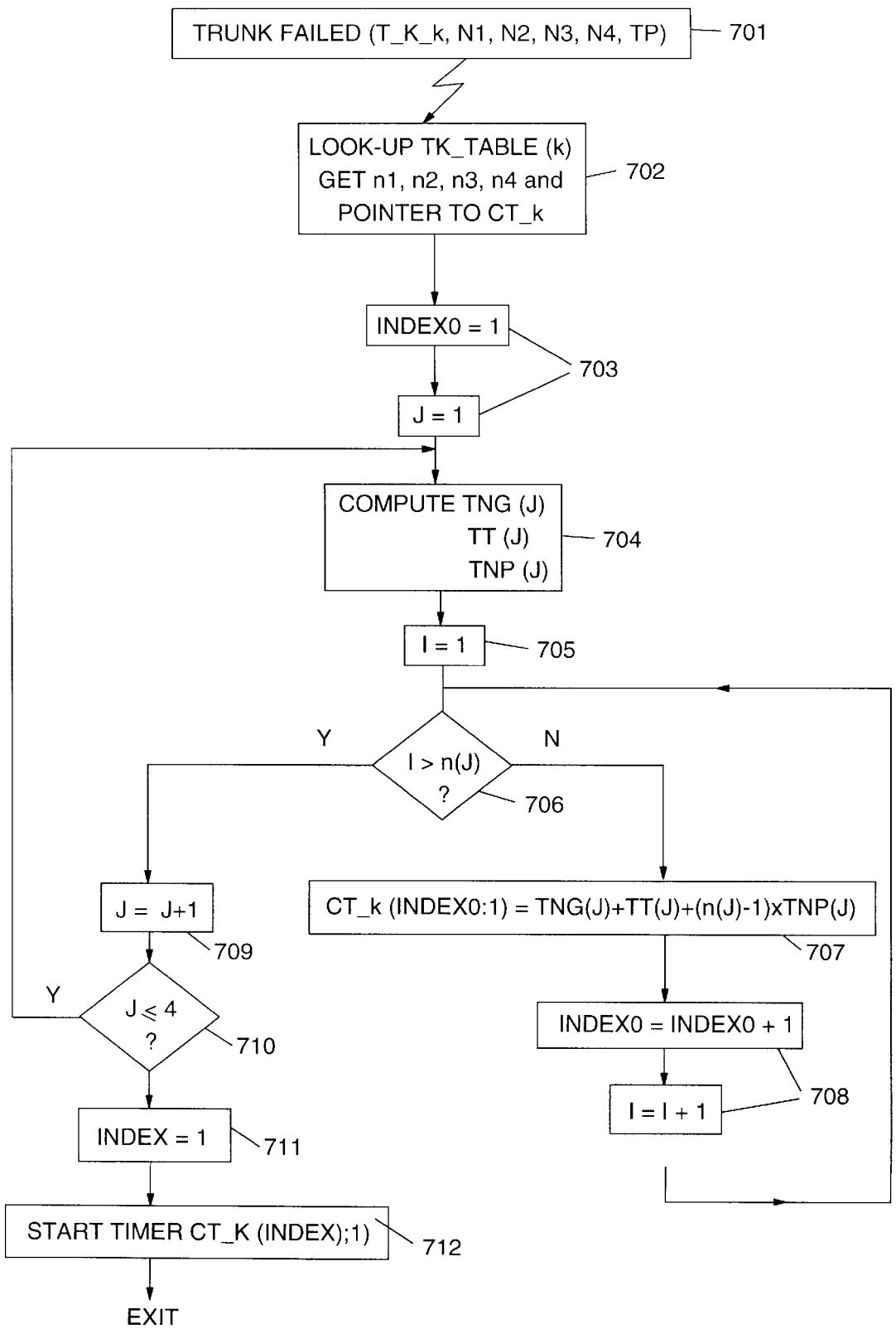
FIGS. 7 and 8 are flowcharts for implementing the method of the invention.

Let's assume now a Trunk "k" failed (see flowchart of FIG. 7). Upon said trunk failure, the network Topology Database Manager detecting said trunk failure broadcasts, via the network Spanning Tree operation, a message (see 701) defining the following parameters:

T_K_k=identification of failing trunk;
$N_1$=number of connections involved through trunk k, in first priority group (e.g. Real Time 1 traffic=highest priority).
$N_2$=number of connections involved, in second priority group (e.g. Real Time 2 traffic=second highest priority).
$N_3$=number of connections involved, in third priority group (e.g. Non Real Time traffic=third priority).
$N_4$=number of connections involved, in fourth priority group (e.g. Non Reserved traffic=lowest priority).
TP=the elementary processing time required for rerouting one connection (a network parameter computed on the basis of actual network topology).

This message is received by all Connection Agents (CAs) in the network, but, naturally it shall be processed only by those CAs involved in the trunk failure. Each said CA shall then look up its TK_Tab(k) (step 702) and get therefrom the number of local connections involved in each priority group (say $n_1,n_2,n_3,n_4$) and the corresponding pointer to the Connection Table (CT_k). An index (INDEX0) and a priority variable J are set to one (703). Then (step 704), the following parameters are computed:

(a) $TNG_j$: the time to wait before starting the processing of next priority group connections, which may be computed according to:

$$TNG_j = \sum T_{j-1} \text{ with } T_j = N_j * TP$$

j=2,3,4. * being used herein as a multiplication symbol.
(For first priority group, TNG1=0)

(b) $TT_j$: a time to wait before starting the processing of the current priority group. To that end, each Connection Agent is assigned a random number $R_j$, with: $0 \leq R_j \leq TF_j$ and $TT_j=R_j$ wherein $TF_j$ is the free processing time for priority group j.
$TF_j=T_j-t_j$
$t_j=n_j*TP$;
$t_j$ is therefore the processing time for priority group j in the considered Connection Agent.

(c) $TNP_j$: time to wait between two rerouting processing in the current group.

$$TNP_j=(T_j-TT_j)/n_j$$

Once $TNG_j$, $TT_j$ and $TNP_j$ are computed, the process may proceed by setting a computing variable I to 1 (705) and starting a test (706) to check whether I is higher than the number of connections to be involved in rerouting operations in the considered port and priority group. If not, then (707) the value CT_k is computed through:

$$CT\_k(INDEX0;1)=TNG_j+TT_j+(n_j-1)*TNP_j$$

Then the INDEX0 is incremented, as well as I (708) and the process loops back to step (706) until all connections involved have been processed.

Figure 8:
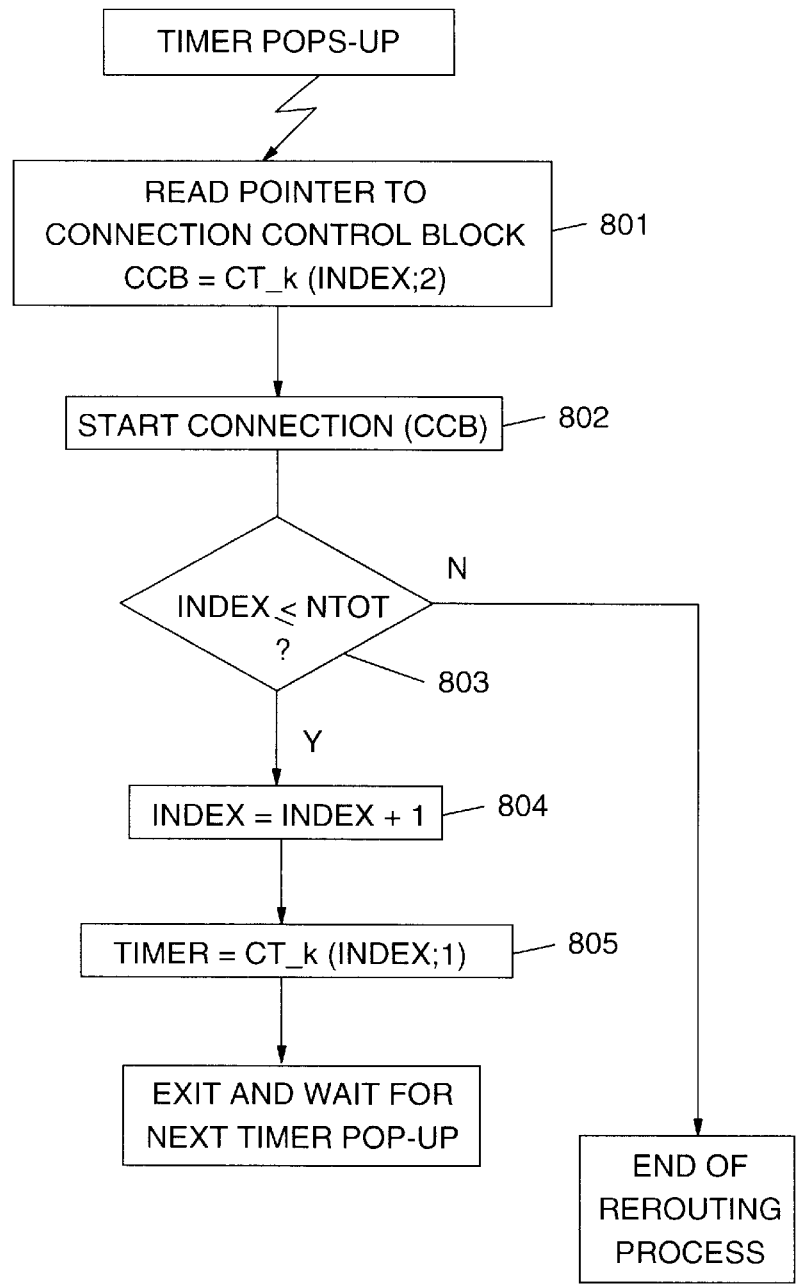

Once the total number of connections in the considered group have been processed; that is, when the answer to test (706) becomes positive, j is incremented (709), up to four (i.e. the number of priority groups considered herein). As long as $j \leq 4$, (see step 710) the routine loops back to step (704). Once the answer to test (710) becomes negative, an external variable (INDEX) is set to one (711), and the computed CT_k(INDEX;1) is loaded into a timer and the timer is started (712), that is, decremented until it "pops-up" (i.e. reaches zero) (see FIG. 8).

When the timer pops-up, the Connection Control Block (CCB) pointed at (see CT_k in FIG. 6) is read out (step 801 in FIG. 8) and a conventional connection set-up operation may be started (802) with almost no conflicting or colliding situation occurring.

A test (803) is then performed to check whether the INDEX reached the value $NTOT=n_1+n_2+n_3+n_4$. As long as this limit is not reached, the INDEX is incremented (804) and the timer is started (805). The routine may then exit and wait for next timer pop-up.

When the INDEX is over NTOT (step 803) the rerouting process is over.

It should be noted how convenient the method of this invention is. For instance, while, for sake of simplicity, the algorithm described above assumes only one trunk failure at a time, extension to multiple trunk failures is quite immediate. It just involves duplicating timers and indexes.

Figure 9:
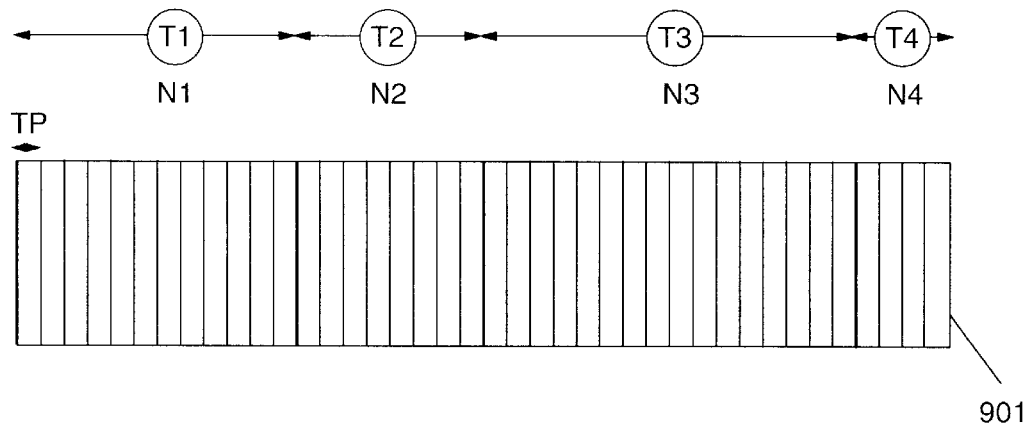
FIGS. 9 and 10 are schematic representations of examples made to illustrate the operation of the invention.
Figure 9:
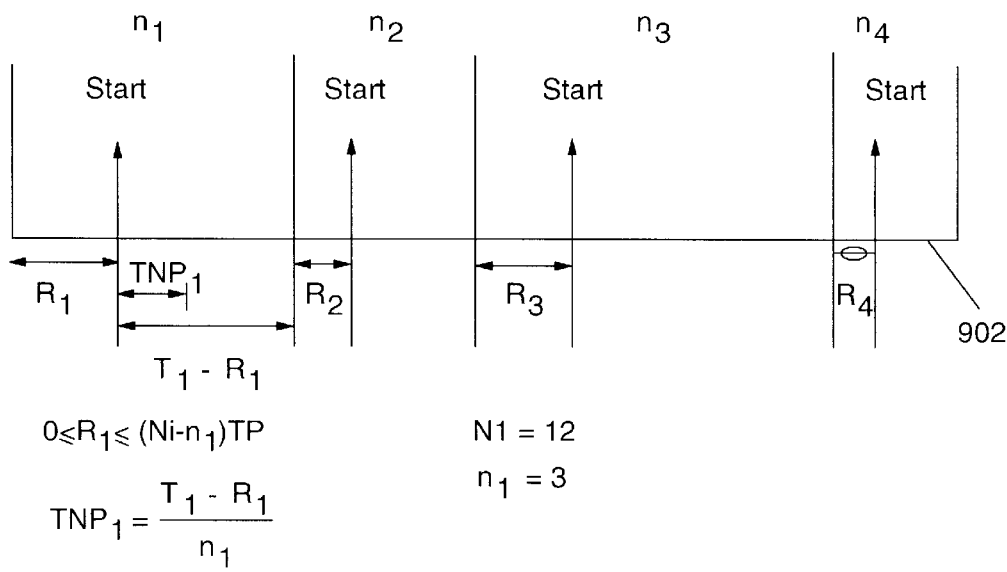
Figure 9:
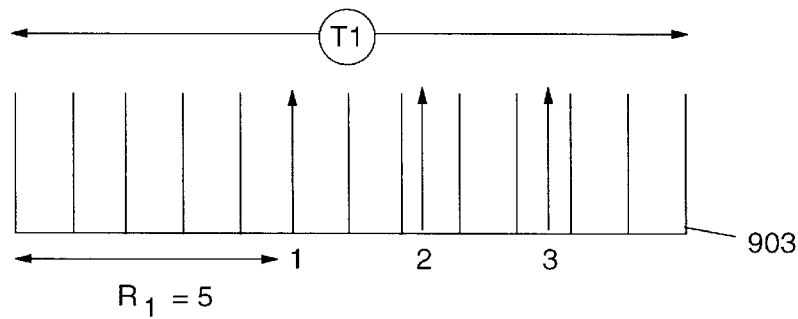

For illustration purposes, a simplified example for implementing the invention has been represented in FIG. 9. The upper part (901) shows four priority groups on a failing trunk involving respectively $N_1,N_2,N_3$ and $N_4$ connections. Let's assume, the system of this invention is processing the operations for rerouting the connections involved with the link failure in one Connection Agent ($CA_1$). The corresponding numbers of connections (see 902) have been referenced by $n_1,n_2,n_3$ and $n_4$ for the four priority groups, respectively. The initial time to wait in the groups before starting the reconnection processings have been labeled $R_1,R_2,R_3$ and $R_4$ respectively. Let's now focus on the first group and let's assume $N_1=12$; $n_1=3$. Therefore $T_1=N_1*TP=12$ time units (TP).

The random number $R_1$ should then be selected between zero and $(N_1-n_1)=9$ time units. Let's assume that five time units have been selected for $R_1$. Therefore the first timer pop-up should occur at time(1) (see 903). The next reconnection processes (2) and (3), each occurs after a delay $TNP_1$ equal to $(T_1-R_1)/n_1=(12-5)/3=2.33$ time units.

Figure 10:
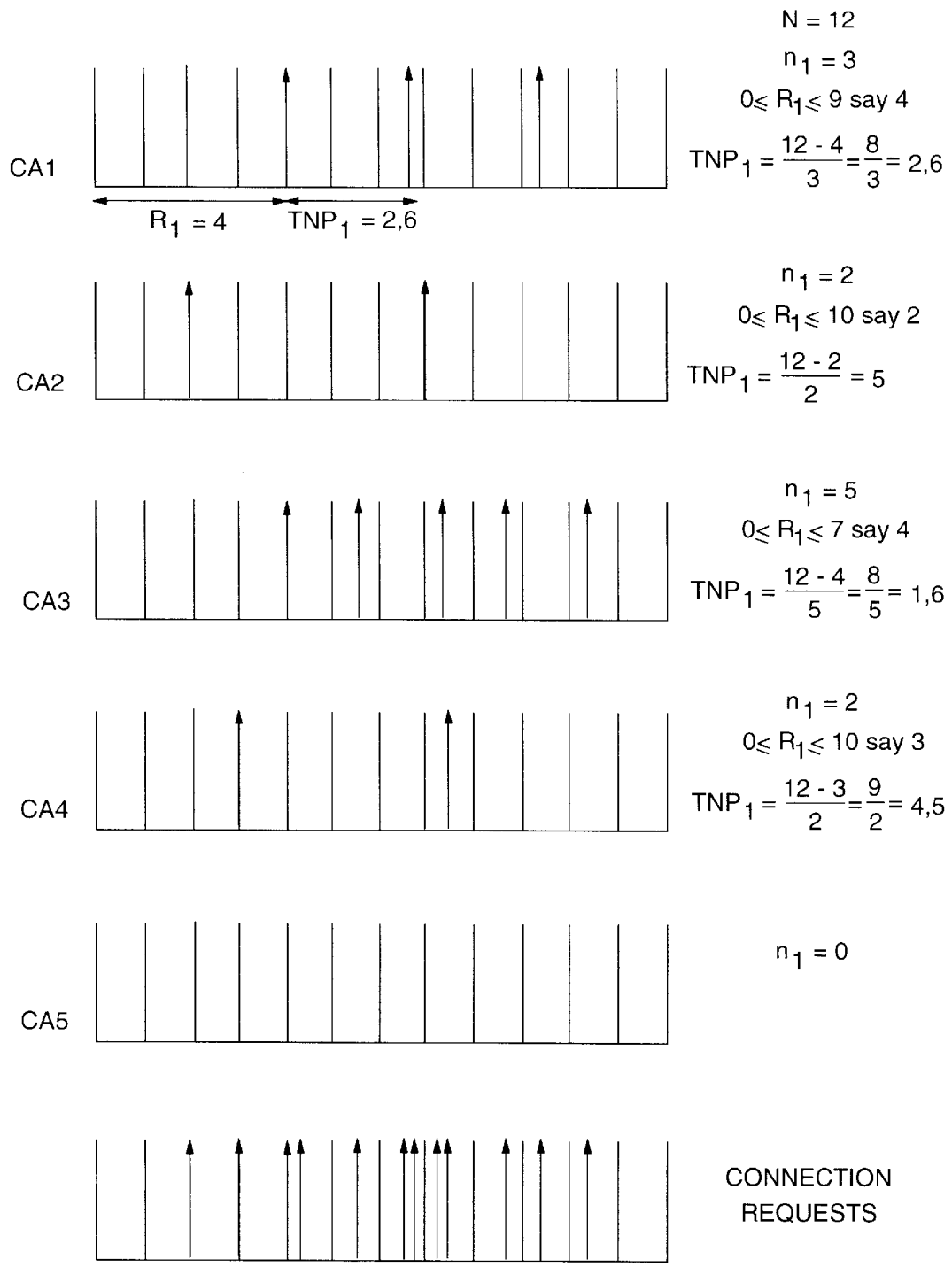

Represented in FIG. 10, is a second example, meant to illustrate how the connection process operates when several Connection Agents, say five CAs referenced $CA_1$, $CA_2$, . . . $CA_5$ are involved in the trunk failure, for a group 1 priority. We still assume that $N_1=12$, and that $n_1=3$; $n_2=2$; $n_3=5$; $n_4=2$ and $n_5=0$.

Then, for $CA_1$, $R_1$ should be again selected between 0 and 9, say 4. $TNP_1=(12-4)/3=2.6$ time units. The reconnections should start after 4 time units and then be spaced by 2.6 times units (see line referenced $CA_1$ in the figure).

For $CA_2$, $R_2$ should be selected between zero and $(N_1-n_2)=12-2=10$, say 2 and $TNP_1=(12-2)/2=5$. The first reconnection should start at second time unit and the next one be spaced by 5 time units (see line $CA_2$).

For $CA_3$, $R_3$ should be selected between zero and $(N_1-n_3)=12-5=7$, say 4 and $TNP_1=(12-4)/5=1.6$ time units. The reconnections are then operated as represented on line $CA_3$.

For $CA_4$, $R_4$ should be selected between zero and $(N_1-n_4)=12-2=10$, say 3, and $TNP_1=(12-3)/2=4.5$ time units. The reconnections are synchronized as represented on line $CA_4$.

$CA_5$ has no reconnections to process since $n_5=0$.

Finally the connection process, as received at Trunk Connection Manager is made according to the timing represented on the bottom line of FIG. 10 showing the $N_1=12$ reconnections involved in priority group1 for the considered example.

As it appears in FIG. 10, the conflicting situations requiring retries when they do appear (see first rerouting synchronizations on $CA_1$ and $CA_3$) are particularly limited, which optimizes on the overall additional control traffic and correlative bandwidth occupation, as well as duration of the whole process (see (b) in FIG. 4). In addition, as shown in the above description the invention is implementable in existing networks with particularly limited additional means, which, from cost efficiency and development time requirements, is particularly attractive.

We claim:

1. A method for optimizing the connection set-up time and correlative communication bandwidth occupation required to perform connection reroutings to recover from network failure, in a high speed communication network interconnecting end-users via so-called connection paths through network nodes and trunks, said nodes including access nodes and intermediate nodes, said users being attached to the network via access nodes, each node storing an image of current operating network into a so-called Topology Database including the current number of connections (n) originating in an access node for each network trunk and including means for updating said image, said method including:

detecting a network failure and identifying a trunk involved in said network failure;

noting the total number (N) of connections affected by said trunk failure;

broadcasting said number (N) throughout the network wherein each network access node affected by said trunk failure is being provided with said number N information;

providing each said access node with a network dependent parameter (TP), representing the elementary processing time required for rerouting a single network connection;

providing each said affected access node with a random number (R) between zero and $(N-n)\times TP$;

computing a delay $TNP=(T-R)/n$, wherein $T=N\times TP$; and, in each access node affected by said trunk failure, starting reconnection set-up operations at time R and spacing the subsequent connections set-ups by a time equal to TNP.

2. A method for optimizing the connection set-up time and correlative communication bandwidth occupation required to recover from network failure, according to claim 1, in a multipriority environment wherein various Qualities of Service (QoS) may be assigned to the network users, whereby said total number (N) of connections affected by said trunk failure is split into so-called priority groups including N1, N2, . . . , affected connections, respectively, said method being characterized in that said reconnections are set-up in a decreasing priority order.

3. A method for optimizing the connection set-up time and correlative communication bandwidth occupation required to recover from network failure, according to claim 2 wherein the time to wait before starting the processing of reconnection of a given priority group of connections is computed for being equal to the sum of times required for processing all reconnections of higher priority groups involved in the reconnection process.

4. A method for optimizing the connection set-up time and correlative communication bandwidth occupation required to recover from multiple trunk failures within the network by rerouting the connections affected by said failures, characterized in that the network trunks references are listed in each said nodes Topology Databases in a predefined order, whereby the rerouting operations are performed as defined in claims 1 through 3 on trunk by trunk bases in said predefined list order.

5. A method according to claims 1 or 2 wherein said connection reroutings are due to a trunk failure deriving from the performance of so-called connection preemptions.

6. A method for optimizing the connection set-up time and correlative communication bandwidth occupation required to perform connection reroutings to recover from network failure, according to claim 2 wherein said number of priority groups is selected for being equal to four.

7. A method for optimizing the connection set-up time and correlative communication bandwidth occupation required to perform connection reroutings to recover from network failure, according to claim 6 wherein said broadcasting operation is performed via a so-called spanning Tree arrangement of the network.

8. A system for optimizing the connection set-up time and correlative communication bandwidth occupation required to perform connection reroutings to recover from network failure, in a high speed communication network (100) interconnecting end-users via so-called connection paths through network nodes (101–108) and links/trunks (109), said nodes including access nodes(102, 103, 104, 105), and intermediate nodes (101, 106, 107, 108), said users being attached to the network via access nodes, each node storing an image of current operating network into a so-called Topology Database including the current number of connections (n) originating in said access node for each network trunk, and including means for updating said image, said system including:

means for detecting a network failure and identifying a node and trunk involved in said network failure;

means for addressing said involved node Topology Database and deriving the total number (N) of connections affected by said trunk failure, therefrom;

means for broadcasting said number (N) and a network dependent parameter (TP), representing the elementary processing time required for rerouting a single network connection, throughout the network via a so-called network spanning Tree arrangement whereby each network access node affected by said trunk failure is being provided with said (N) and (TP) parameters;

means for providing each said affected access node with a random number (R) between zero and (N−n)×TP;

means for computing in each said affected access node a delay TNP=(T−R)/n, wherein T=N×TP; and counter in each access node affected by said trunk failure, for starting said reconnection set-up process at time R and spacing the subsequent connections set-ups by a time equal to TNP.

9. A system according to claim 8, for optimizing the connection set-up time and correlative communication bandwidth occupation required to recover from network failure, in a multipriority environment wherein several Qualities of Service (QoS) may be assigned to the network users, whereby said total number (N) of connections affected by said link failure is split into so-called priority groups including N1, N2, . . . affected connections, respectively, said system being characterized in that each said access node includes:

computer for computing Ni*TP with i=1, 2, 3, . . . up to the total predefined number of priority groups;

means for initializing each said counter means in each access node affected by the trunk failure with a value equal to ΣNi*TP, for i being equal to each priority level higher than the level of the priority group being currently processed, whereby the reconnection process of a given priority group is being properly initially delayed in each access node and then each subsequent reconnection set-up properly initialized in order to minimize colliding reconnection requests.

* * * * *